United States Patent
Boutcher et al.

(10) Patent No.: US 10,827,068 B1
(45) Date of Patent: *Nov. 3, 2020

(54) METHOD AND APPARATUS OF PROCESSING CALLER RESPONSES

(71) Applicant: OPEN INVENTION NETWORK LLC, Durham, NC (US)

(72) Inventors: James K. Boutcher, Omaha, NE (US); David Scheet, Omaha, NE (US); Jeffrey William Cordell, Omaha, NE (US); Daniel E. Smith, Omaha, NE (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,186

(22) Filed: May 28, 2019

Related U.S. Application Data

(63) Continuation of application No. 15/978,883, filed on May 14, 2018, now Pat. No. 10,306,062, which is a continuation of application No. 15/445,049, filed on Feb. 28, 2017, now Pat. No. 9,973,629, which is a continuation of application No. 14/988,185, filed on Jan. 5, 2016, now Pat. No. 9,584,660, which is a continuation of application No. 14/657,034, filed on Mar. 13, 2015, now Pat. No. 9,232,059, which is a
(Continued)

(51) Int. Cl.
*H04M 3/51* (2006.01)
*H04M 1/64* (2006.01)
*H04M 3/527* (2006.01)
*H04M 3/493* (2006.01)

(52) U.S. Cl.
CPC .......... *H04M 3/5166* (2013.01); *H04M 1/64* (2013.01); *H04M 3/4936* (2013.01); *H04M 3/5158* (2013.01); *H04M 3/527* (2013.01); *H04M 2242/12* (2013.01); *H04M 2250/58* (2013.01)

(58) Field of Classification Search
USPC ...................................................... 379/88.06
See application file for complete search history.

(56) References Cited

U.S. PATENT DOCUMENTS 7,412,383 B1 8/2008 Alonso et al.
2004/0215453 A1* 10/2004 Orbach .................. G10L 15/22
704/231
(Continued)

*Primary Examiner* — Amal S Zenati

(57) ABSTRACT

Disclosed is a method, apparatus, system and non-transitory computer program product configured to process user call responses and assign caller specific preferences to the user based on the caller's feedback. One example method of processing spoken words from a user of a calling platform may include operations, such as calling a user via a call processing device, and sending a call prompt message to the user after the user has answered the call, the call prompt message soliciting a user response. The user may respond and the response is received as a spoken call greeting from the user in response to the call prompt message. Other operations may include recording the spoken call greeting, and determining whether the spoken call greeting is indicative of a language preference. The system may process the user's word or utterances and assign language preferences to the user based on the user provided information.

20 Claims, 4 Drawing Sheets

Related U.S. Application Data continuation of application No. 13/089,913, filed on Apr. 19, 2011, now Pat. No. 8,983,038.

(56) References Cited

U.S. PATENT DOCUMENTS

| | | | |
|---|---|---|---|
| 2006/0067508 A1* | 3/2006 | Basson | H04M 3/5233 379/265.12 |
| 2007/0206758 A1* | 9/2007 | Barak | H04M 3/53375 379/202.01 |
| 2010/0191530 A1 | 7/2010 | Nakano et al. | |
| 2012/0010886 A1 | 1/2012 | Razavilar | |

* cited by examiner

METHOD AND APPARATUS OF PROCESSING CALLER RESPONSES

TECHNICAL FIELD OF THE INVENTION

This invention relates to a method and apparatus of processing a call to an automated call center menu, and, more particularly, to processing a caller or callee's spoken response, and automatically selecting subsequent call handling procedures based on the obtained caller information.

BACKGROUND OF THE INVENTION

In conventional call handling procedures, algorithms and related call handling systems, a caller who dials into an automated call center is presented with the option to hear the call related menu options in the English language, or, in most instances in the U.S. territories, in the English and Spanish languages. For instance, two different versions of the same message may be presented to a caller or callee providing them with an option to select English or Spanish by pressing "1" for English or "2" for Spanish.

During the course of the phone call, user behavior information is often disregarded or discarded, and is not used to process a response or offer additional services to the caller. For example, a caller may submit a request, speak in a particular foreign language and/or share a greeting that would provide information about the particular caller without having to request such information.

Certain organizations may present more user preference options, such as language options to callers depending on the preferences of the associated organization. Regardless of the options presented to the caller, none of these conventional call handling processes are adaptive to collect and analyze the caller's feedback, voice or other information commonly presented during the call session. Conventional call processing systems do not perform intelligent identification of caller behavior and use the identified caller behavior to better serve the caller.

BRIEF SUMMARY OF THE INVENTION

One example embodiment of the present invention may include a method of processing spoken words from a user of a calling platform. The method may include calling a user via a call processing device, and sending a call prompt message to the user after the user has answered the call, the call prompt message soliciting a user response. The method may also include receiving a spoken call greeting from the user in response to the call prompt message, and recording the spoken call greeting. The method may also include determining whether the spoken call greeting is indicative of a language preference.

Another example embodiment of the present invention may include an apparatus configured to process spoken words received from a user of a calling platform. The apparatus may include a call processing unit configured to call a user, and a transmitter configured to transmit a call prompt message to the user after the user has answered the call, the call prompt message soliciting a user response. The apparatus may also include a receiver configured to receive a spoken call greeting from the user in response to the call prompt message, a memory configured to record the spoken call greeting, and a processor configured to determine whether the spoken call greeting is indicative of a language preference.

DETAILED DESCRIPTION OF THE INVENTION

Figure 1:
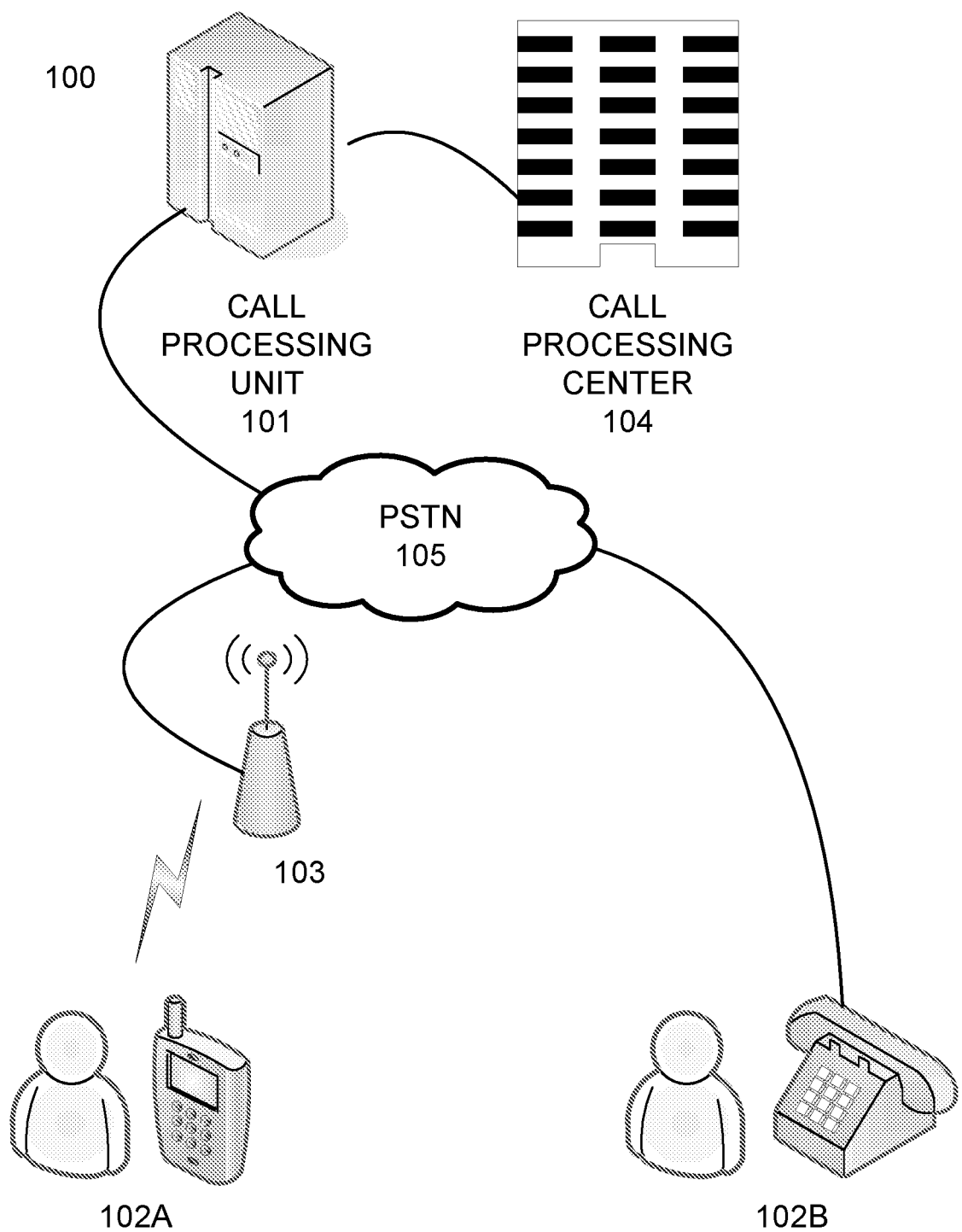
FIG. 1 illustrates an example network configuration, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, a caller 102 (see FIG. 1) may establish or receive a call to an automated call processing center. For example purposes, the end user 102 may be deemed a caller (one who initiates a call) or a callee (one who receives a call). One example of an automated call processing center 104 may include a recorded voice inquiring about user related information to save time and resources when establishing contact with a particular caller. For example, an automated call processing center 104 may include an automated call processing unit 101 that receives and/or dials calls to a caller recipient or call dialer 102A or 102B. A base station 103 may be used to communicate with a wireless caller 102A and transfer the call or data message across the PSTN 105.

Alternatively, a landline phone 102B may be used to communicate across the PSTN 105 to the call processing unit 101.

FIG. 1 illustrates an example automated call processing communication system 100, according to example embodiments of the present invention. Referring to FIG. 1, an end user 102A and/or 102B may be called by the call processing unit 101. The call processing unit 101 may be a call switch or digital switching device (e.g., router, switch, VoIP device, etc.). The end users may be telephone devices, cellular mobile stations, smartphone devices and/or other communication devices.

Alternatively, the end user 102A or 102B may initiate their own call to the call processing unit 101. The calls may be routed through the public switched telephone network (PSTN) 105 to the call processing unit 101 of the call processing center 104. As calls are received or initiated with the end users 102A or 102B, call-related menu options, automated voice processing options and other communication signaling messages may be presented to the end user caller 102.

In operation, when the caller 102 establishes a call, speech recognition may be used to determine how the caller greets the voice recorded menu options. For example, a caller may respond to a live agent or pre-recorded voice menu prompt by saying "Hello" if they speak English, "Wie Gehts" if they speak German and "Hola" if they speak Spanish. This personal information could be used to tailor all subsequent responses to the caller based on this known characteristic (e.g., language preference). The call processing unit 101 may be able to determine the caller's native language from their greeting and a corresponding outbound notification may be played in that language. Discovering a caller's native language, conversation style or other personalized characteristics may provide a more customized call experience.

An outbound notification may be an automated notification that is sent to an outbound line to connect with the caller. In order to determine which language is being spoken, call processing unit 101 performs a real-time audio analysis on the spoken response to determine what the caller said when prompted to speak by the automated recording or live agent. A match operation is then performed with the caller's spoken result against a list of possible responses to determine the caller's language. The possible responses may be pre-stored in a database of different language types 440, which is described in further detail below (see FIG. 4).

Other example operations that may be used to determine the callers native language may include recording and storing initial utterances, such as, "En Espanol", or "I speak English." The caller's initial spoken utterances may provide information which may be retrieved from the caller after the notification procedure has begun. For example, an initial determination may be made as to the user's language preference, and additional spoken words or utterances may be used to confirm the original determination made, or, may modify a previous determination. For example, if a user were to initially greet the call menu with "Hi" and it was not clear whether the person was native to English or Spanish, an initial determination may be made that the user is of English origin by default, but a subsequent spoken utterance, such as, "Espanol", "no English", etc. may cause a re-interpretation of the user's call preference.

Initially, a first caller characterization must be performed to categorize the caller as having a first preference or characteristic (English, Espanol, German, Northern, Southern, etc.). The first caller characterization may be performed by categorizing the caller's first spoken words or utterances.

For example, an initial spoken word or utterance may yield an initial characterization of English. The initial characterization may have a corresponding relative level of confidence, such as a confidence level ranking between "1" and "5", with "1" being the least confident and "5" being the most confident. The confidence level ranking may be assigned to the language assignment itself and/or to the words or utterances spoken by the user.

The confidence level ranking may be based on a pre-stored word or phrase that is matched to the user's spoken words or utterances. For example, a simple "Hi" may provide an initial characterization of English based on a relatively low confidence level ranking of "1" or "2." Since "Hi" is commonly used throughout the world and no words are used to further support the user's language preference, the confidence level ranking would remain relatively low. However, in contrast to that example, capturing a user spoken phrase, such as "No English, Espanol por favor", may yield a higher confidence level ranking of "4" or "5" that the user's preference is Espanol and not English. The confidence level ranking may be based on a relative strength of the spoken response. For example, if the first characterization yielded a low confidence level ranking of "1" or "2", by default, an additional characterization procedure may be performed since the relative strength and corresponding certainty of the user's preference is low.

Depending on the confidence level ranking of the initial characterization of the caller's language, an additional question or inquiry may be asked to raise the current level of confidence. For example, if the first characterization yielded a low confidence level ranking of "1" or "2", by default, an additional characterization procedure may be performed. If however, the initial characterization had a high confidence level ranking for a given language selection, such as a "4" or "5", no additional questions would be required for characterization purposes.

In an effort to maintain ongoing failsafe measures, the system may continue listening for negative utterances, such as "No", "I don't understand", "I can't understand", "I don't speak English/Spanish/German", etc. The instance(s) of negative utterances may invoke additional questioning, prompting and the additional processing of confidence level rankings and language designations.

Changing back and forth between language designations may be performed as the user may not prefer the outcome of one language and may prefer attempting to speak in a different language. Users may find their native language is harder to understand or communicate with the automated system and may prefer a different language depending on their accent, and other system specific settings, such as geographical language context. Since languages like Espanol/Spanish, are spoken differently all over the world, the user's native tongue may not be compatible with the system, so the user may declare a change-over to English for more optimal results. The user may change-over at any time, and certain utterances may be characterized for change-over purposes, such as "In English!", "I don't understand", "No entiendo", etc.

Figure 2:
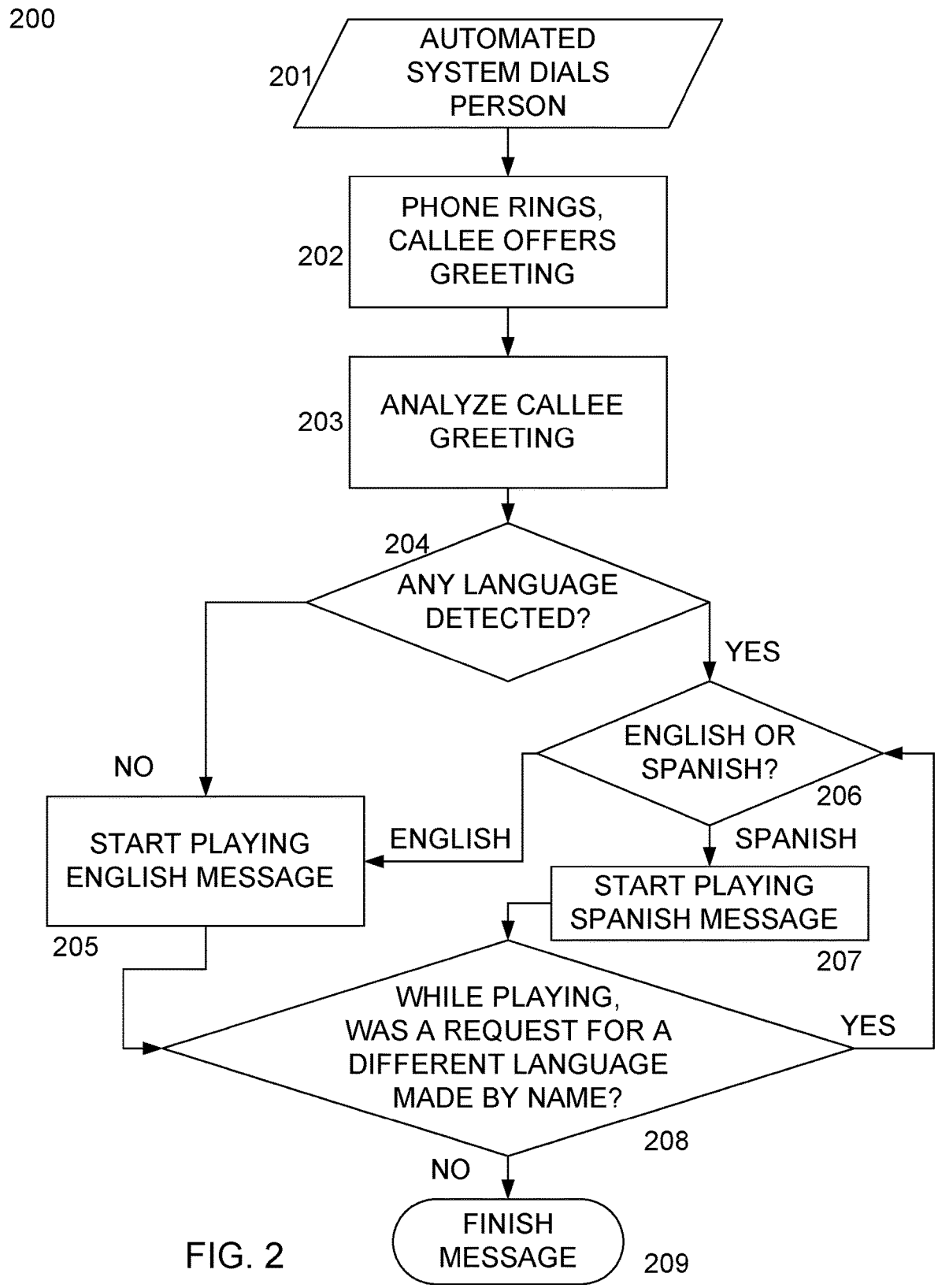
FIG. 2 illustrates an example flow diagram of an example method of operation, according to example embodiments of the present invention.

FIG. 2 illustrates an example flow diagram according to example embodiments of the present invention. Referring to FIG. 2, an automated system may dial a callee or user at operation 201. The callee answers the call, greets the calling system at operation 202 and the spoken greeting is then recorded and/or analyzed at operation 203. A determination is then made at decision operation 204 as to whether a particular language was identified from the analyzed greeting. If not, then the default message or menu options will be presented at operation 205 in English. However, after the decision to proceed in the English language is made, a further determination may be made by the call processing unit as to whether any subsequent actions have been taken by the callee regarding a language preference, at operation 208. If not, the process may be finished at operation 209. If so, a determination may be made as to whether the callee is requesting English or Spanish at operation 206, and, as a result, another language determination may be made. Clearly, additional language determinations may be made beyond English and Spanish to include other languages and options.

The call may be transferred to a live agent queue of potential agents who could further handle the call. The live agent queue may represent a pool of agents all of which speak the language requested by the callee. For example, if the callee selects an option via their calling device to transfer to a language-specific agent, then the call may be transferred to a corresponding language-specific queue of agents, any of which may handle the call when a free agent is ready.

In another example, if the callee answered "Hola" and the Spanish menu options and related call data is presented to the callee, and the callee then changes his mind and desires to switch back to English, the callee may simply respond in English ("In English, please"). In response, the call system may detect the English spoken phrase or words and switch from the current Spanish operating language to English. Next, the system may finish the automated menu options and may ask the user to "press "1 if you'd like to speak to a representative." The user may press "1" and be forwarded to an English line group of agents in the call center since English was the final language dynamically selected, either initially, or, changed-over to at a later time by the callee.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network element 300, which may represent any of the above-described network components.

Figure 3:
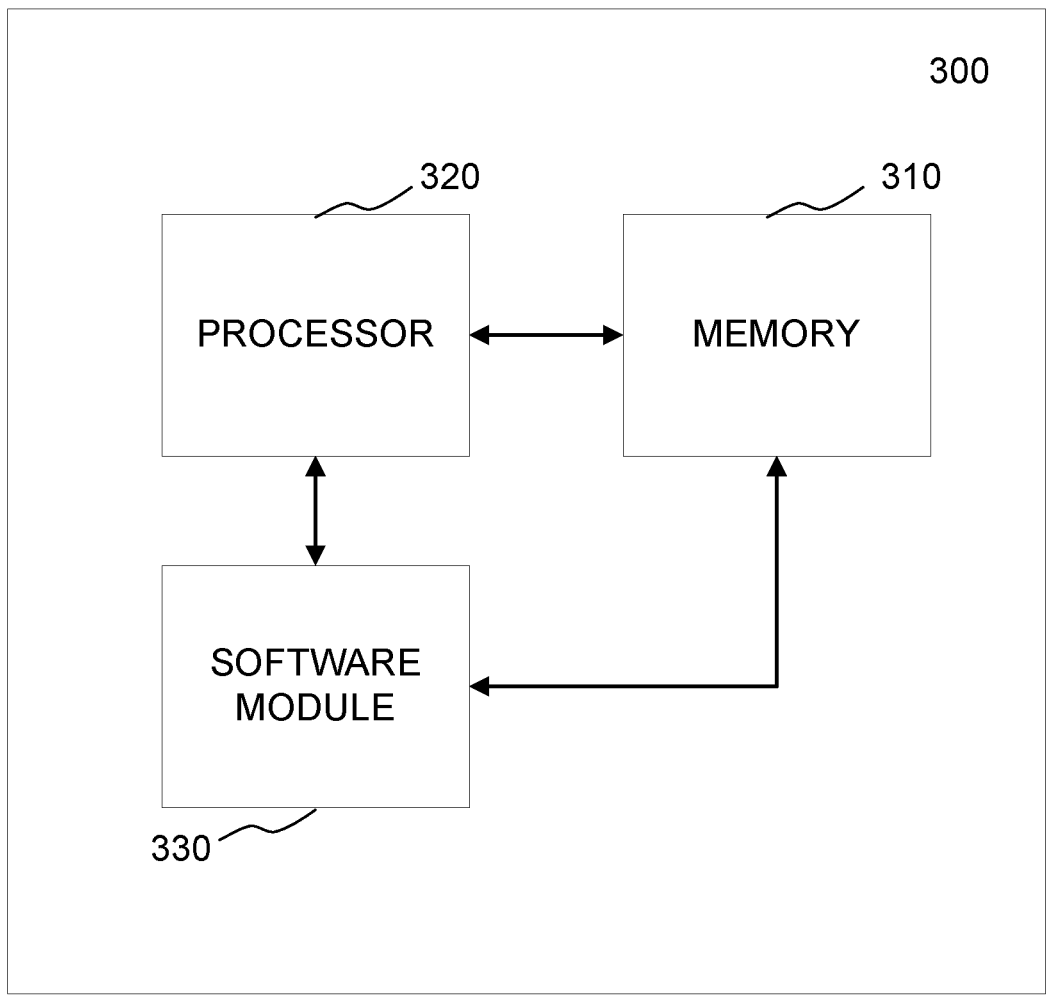
FIG. 3 illustrates an example network entity, receiver and/or transmitter configured to store software instructions and perform example operations disclosed throughout the specification.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
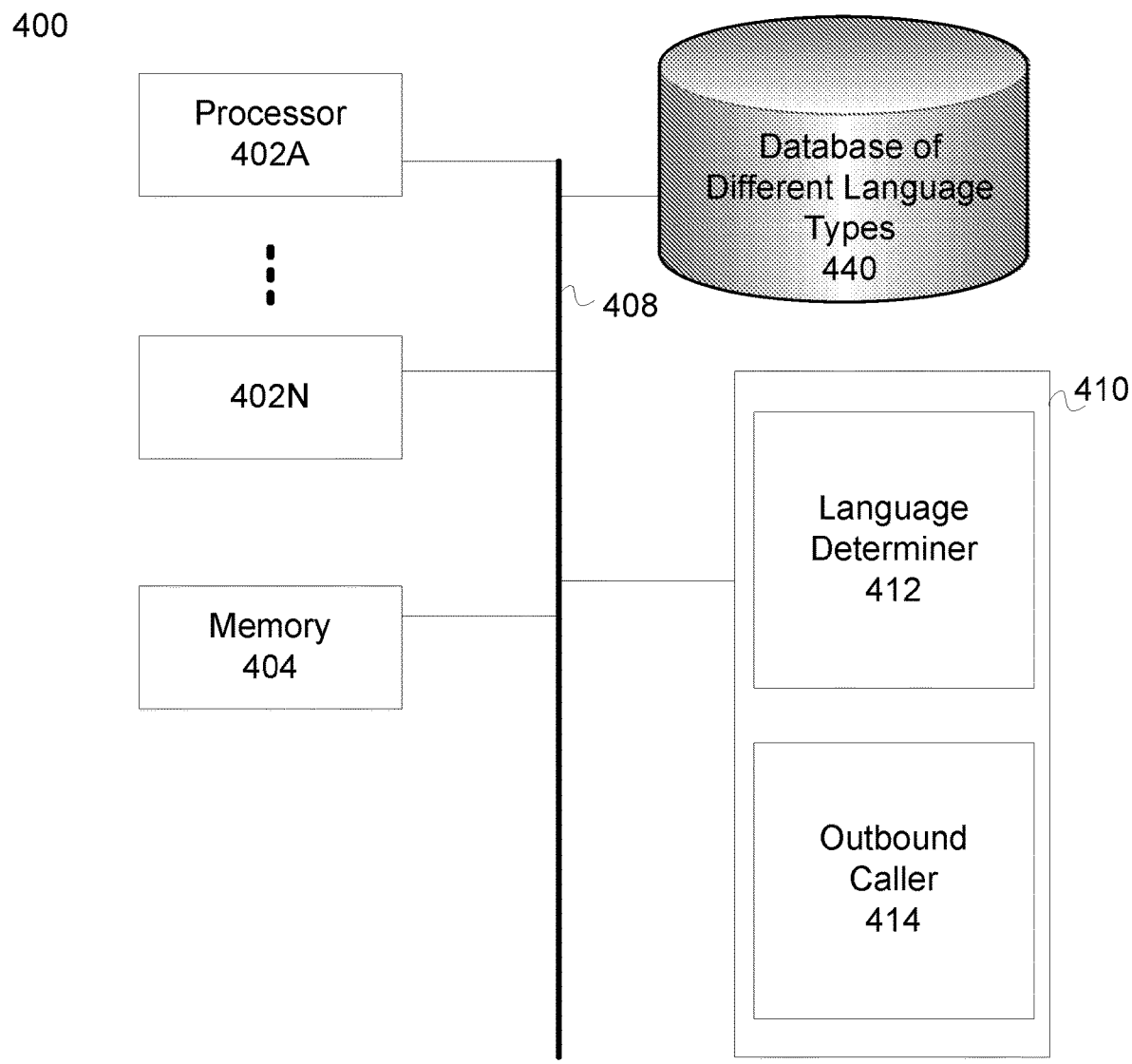
FIG. 4 illustrates an example system configured to perform operations associated with the example embodiments disclosed throughout the specification.

FIG. 4 illustrates an example system configured to perform the various operations of the above-noted example embodiments of the present invention. Referring to FIG. 4, a system 400 includes any number of processors 402A through 402N, which correspond to any number of computing devices. A memory 404 may store instructions and/or data obtained from the caller/callee. A bus 408 may provide a communication medium between the processors 402, memory 404 and the system processing modules 410.

The processing module 410 may include a language determiner 412 and an outbound caller module 414. In operation, the outbound caller module 414 may dial the end user or caller in an attempt to establish a telephone call. The outbound caller module 414 may also initiate a communication greeting or solicit a greeting from the callee 102. The callee 102 may speak when prompted to provide an initial greeting, which may be identified as having a corresponding initial characteristic by the language determiner module 412. The callee 102 may provide a spoken word, phrase or utterance that is recorded and analyzed against pre-stored caller data in the database of different language types 440. When a match is discovered, the subsequent menu options, prompts and caller scripts may be configured based on the initial greeting offered by the callee 102. As stated above, subsequent categorizing operations may be performed to ensure ongoing user satisfaction.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   performing a first language preference characterization operation to generate a first confidence level that at least one initial utterance of a spoken call greeting indicates a particular language as a language preference; and
   confirming the language preference based on a second confidence level generated by performing at least one additional language preference characterization operation on a subsequent utterance.

2. The method of claim 1, further comprising:
   calling a user via a call processing device.

3. The method of claim 2, wherein the calling a user via the call processing device comprises:
   dialing at least one of a landline phone, mobile phone, and smartphone associated with the user.

4. The method of claim 1, further comprising:
   determining that the spoken call greeting is not related to a language preference; and
   assigning a default language preference to a user.

5. The method of claim 1, further comprising:
   receiving a subsequent spoken call response including the at least one additional utterance from a user after the spoken call greeting; and
   determining whether the spoken call response is indicative of a language preference based on content of the at least one additional utterance.

6. The method of claim 5, further comprising:
assigning the language preference to the user based on the first confidence level indicative language preference.

7. The method of claim 1, further comprising:
recording the spoken call greeting and the at least one initial utterance.

8. An apparatus, comprising:
a processor configured to:
perform a first language preference characterization operation to generate a first confidence level that at least one initial utterance of a spoken call greeting indicates a particular language as a language preference; and
confirm the language preference based on a second confidence level generated by performing at least one additional language preference characterization operation on a subsequent utterance.

9. The apparatus of claim 8, comprising:
a call processing unit configured to call a user.

10. The apparatus of claim 9, wherein the call processing device is configured to:
call at least one device associated with the user, the at least one device including at least one of a landline phone, mobile phone, and smartphone.

11. The apparatus of claim 8, wherein the processor is further configured to:
determine that the spoken call greeting is not related to a language preference, and assign a default language preference to a user.

12. The apparatus of claim 8, comprising:
a receiver configured to:
receive a subsequent spoken call response from a user after the spoken call greeting including the at least one additional utterance, and
wherein the processor is further configured to:
determine whether the spoken call response is indicative of a language preference based on content of the at least one additional utterance.

13. The apparatus of claim 12, wherein, the processor is configured to:
assign the language preference to the user based on the first confidence level indicative language preference.

14. The apparatus of claim 8, comprising a memory configured to:
record the spoken call greeting and the at least one initial utterance.

15. A non-transitory computer readable storage medium configured to store instructions that when executed by a processor cause the processor to perform:
a first language preference characterization operation to generate a first confidence level that at least one initial utterance of a spoken call greeting indicates a particular language as a language preference; and
confirming the language preference based on a second confidence level generated by performing at least one additional language preference characterization operation on a subsequent utterance.

16. The non-transitory computer readable storage medium of claim 15, wherein the instructions further cause the processor to perform:
calling a user via the call processing device.

17. The non-transitory computer readable storage medium of claim 16, wherein the calling a user via the call processing device comprises:
dialing at least one of a landline phone, mobile phone, and smartphone associated with the user.

18. The non-transitory computer readable storage medium of claim 15, wherein the instructions further cause the processor to perform:
determining that the spoken call greeting is not related to a language preference; and
assigning a default language preference to a user.

19. The non-transitory computer readable storage medium of claim 15, wherein the instructions further cause the processor to perform:
receiving a subsequent spoken call response from a user after the spoken call greeting including the at least one additional utterance; and
determining whether the spoken call response is indicative of a language preference based on content of the at least one additional utterance.

20. The non-transitory computer readable storage medium of claim 19, wherein the instructions further cause the processor to perform:
assigning the language preference to the user based on the first confidence level indicative language preference.

* * * * *